000

(12) United States Patent
Kojima et al.

(10) Patent No.: US 10,809,573 B2
(45) Date of Patent: *Oct. 20, 2020

(54) DISPLAY DEVICE

(71) Applicant: Japan Display Inc., Tokyo (JP)

(72) Inventors: Tetsuya Kojima, Tokyo (JP); Hirofumi Wakemoto, Tokyo (JP); Mitsutaka Okita, Tokyo (JP); Daiichi Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,557

(22) Filed: Sep. 6, 2019

(65) Prior Publication Data

US 2019/0391421 A1 Dec. 26, 2019

Related U.S. Application Data

(63) Continuation of application No. 16/217,785, filed on Dec. 12, 2018, now Pat. No. 10,451,925, which is a
(Continued)

(30) Foreign Application Priority Data

Feb. 2, 2017 (JP) ................................. 2017-017588

(51) Int. Cl.
*G02F 1/1339* (2006.01)
*G02F 1/1337* (2006.01)
(Continued)

(52) U.S. Cl.
CPC .......... *G02F 1/1337* (2013.01); *G02F 1/1339* (2013.01); *G02F 1/13394* (2013.01); *G02F 1/133345* (2013.01); *G02F 1/1368* (2013.01); *G02F 2001/133388* (2013.01); *G09G 3/3607* (2013.01); *G09G 3/3677* (2013.01);
(Continued)

(58) Field of Classification Search
None
See application file for complete search history.

(56) References Cited

U.S. PATENT DOCUMENTS 9,696,592 B2  7/2017  Nishino et al.
10,042,213 B2  8/2018  Hirota
(Continued)

FOREIGN PATENT DOCUMENTS

JP  2016-38434  3/2016

*Primary Examiner* — James A Dudek
(74) *Attorney, Agent, or Firm* — Oblon, McClelland, Maier & Neustadt, L.L.P.

(57) ABSTRACT

According to one embodiment, a display device includes a first substrate, a second substrate, a sealant, a liquid crystal layer, an organic insulating film, an alignment film and an inorganic insulating film. The second substrate is opposed to the first substrate. The sealant attaches the first substrate and the second substrate to each other. The liquid crystal layer is arranged between the first substrate and the second substrate. The organic insulating film, the alignment film and the inorganic insulating film are provided on the first substrate. The alignment film contacts the liquid crystal layer. The inorganic insulating film is located between the alignment film and the organic insulating film. At least part of the alignment film contacts the organic insulating film.

10 Claims, 6 Drawing Sheets

Related U.S. Application Data continuation of application No. 15/876,254, filed on Jan. 22, 2018, now Pat. No. 10,197,858.

(51) Int. Cl.
*G02F 1/1333* (2006.01)
*G02F 1/1368* (2006.01)
*G09G 3/36* (2006.01)

(52) U.S. Cl.
CPC ............... *G09G 2300/0426* (2013.01); *G09G 2300/0452* (2013.01)

(56) References Cited

U.S. PATENT DOCUMENTS

| | | | |
|---|---|---|---|
| 10,054,823 B2 | 8/2018 | Fukuoka | |
| 10,197,858 B2 * | 2/2019 | Kojima | G02F 1/13394 |
| 10,451,925 B2 * | 10/2019 | Kojima | G02F 1/133345 |
| 2001/0010567 A1 * | 8/2001 | Rho | G02F 1/133345 349/43 |
| 2002/0186330 A1 * | 12/2002 | Kawasaki | G02F 1/13458 349/43 |
| 2005/0205870 A1 | 9/2005 | Yamazaki | |
| 2008/0137022 A1 | 6/2008 | Komeno | |
| 2009/0289260 A1 | 11/2009 | Sonoda | |
| 2010/0020275 A1 | 1/2010 | Mima | |
| 2011/0176097 A1 | 7/2011 | Shiromoto | |
| 2012/0300163 A1 | 11/2012 | Moriwaki | |
| 2013/0182207 A1 | 7/2013 | Fukuoka | |
| 2014/0063431 A1 | 3/2014 | Shih | |
| 2015/0062512 A1 | 3/2015 | Park | |
| 2015/0168752 A1 | 6/2015 | Shih | |
| 2015/0268489 A1 | 9/2015 | Lee | |
| 2015/0268494 A1 | 9/2015 | Yamaguchi | |
| 2015/0346535 A1 | 12/2015 | Moriwaki | |
| 2015/0346556 A1 * | 12/2015 | Hirota | G02F 1/1339 349/43 |
| 2016/0033814 A1 | 2/2016 | Na | |
| 2016/0147094 A1 | 5/2016 | Choi | |
| 2017/0003526 A1 | 1/2017 | Roudbari | |
| 2017/0017109 A1 | 1/2017 | Park | |
| 2017/0059904 A1 | 3/2017 | Kim | |
| 2017/0110477 A1 | 4/2017 | Han | |
| 2017/0123244 A1 | 5/2017 | Oh | |
| 2017/0123247 A1 | 5/2017 | Hirota | |
| 2017/0146834 A1 | 5/2017 | Tak | |
| 2017/0235167 A1 | 8/2017 | Ishikawa | |
| 2017/0261785 A1 | 9/2017 | Nishino et al. | |
| 2018/0180945 A1 | 6/2018 | Shim | |
| 2018/0203318 A1 | 7/2018 | Abe | |

* cited by examiner

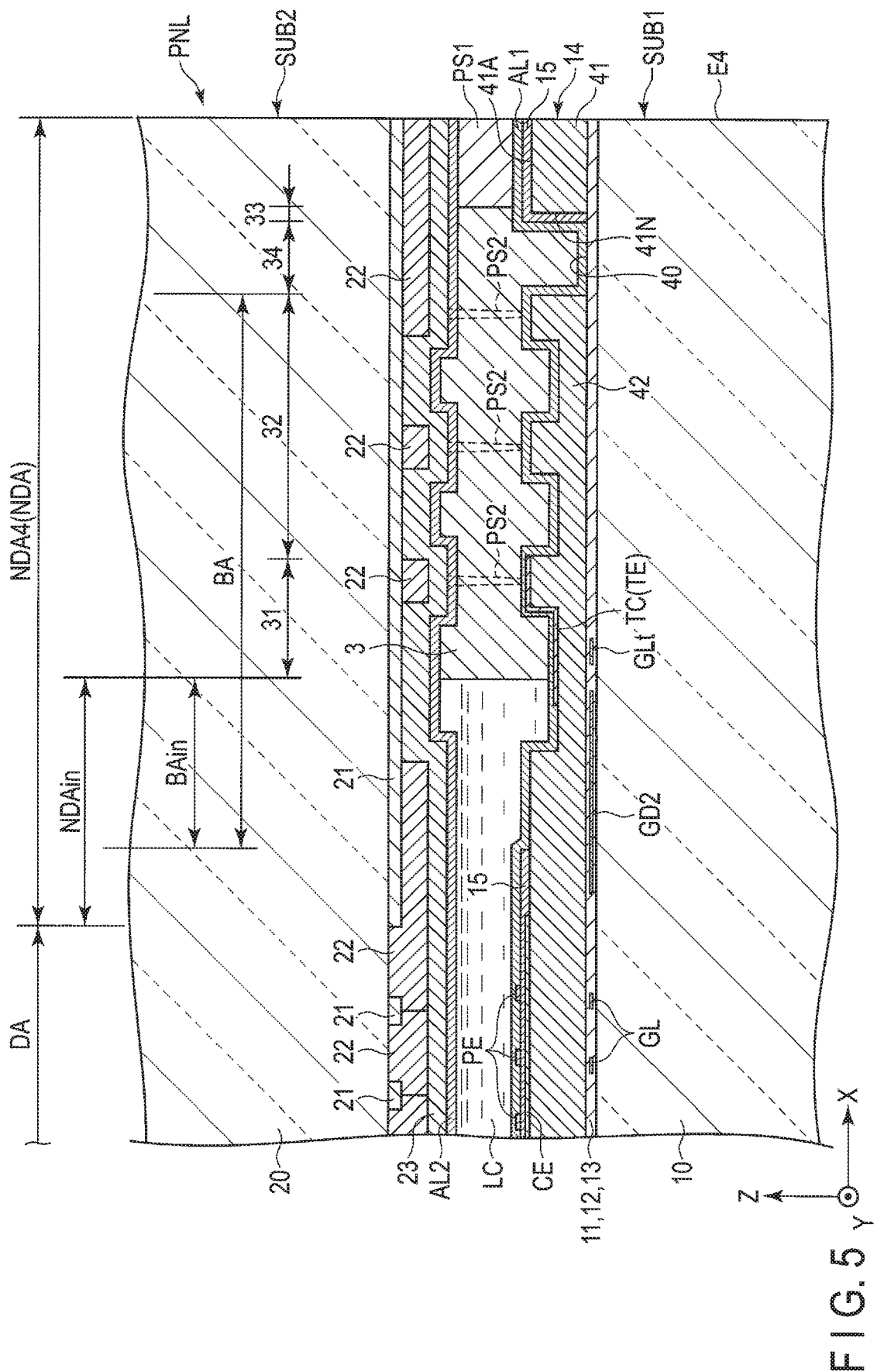
F I G. 5

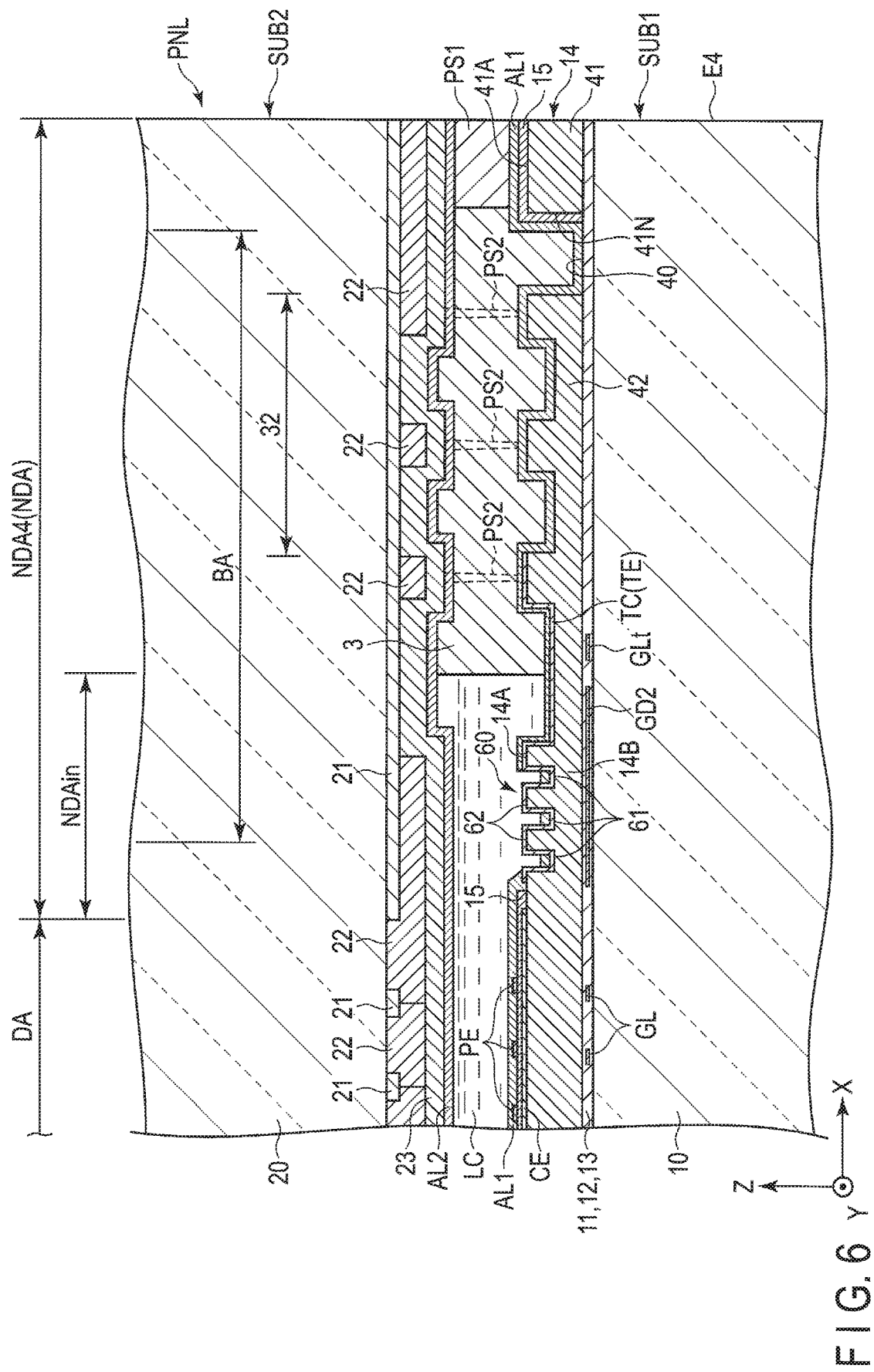
F I G. 6

DISPLAY DEVICE

CROSS-REFERENCE TO RELATED APPLICATIONS

This application is a continuation application of U.S. application Ser. No. 16/217,785, filed Dec. 12, 2018, which is a continuation of U.S. application Ser. No. 15/876,254, filed Jan. 22, 2018, now U.S. Pat. No. 10,197,858, which is based upon and claims the benefit of priority from Japanese Patent Application No. 2017-017588, filed Feb. 2, 2017, the entire contents of all of which are incorporated herein by reference.

FIELD

Embodiments described herein relate generally to a display device.

BACKGROUND

A liquid crystal display device in general includes a pair of substrates, a sealant which attaches the substrates to each other, a liquid crystal layer interposed between the substrates, and an alignment film which aligns liquid crystal molecules included in the liquid crystal layer. If a frame area surrounding a display area is sufficiently broad, the alignment film is formed on the inner side from the sealant. In the recent liquid crystal display device in which the frame is narrowed, the alignment film may be formed up to a location overlapping the sealant in some cases.

Embodiments aim to provide a display device which can display a high-quality image.

BRIEF DESCRIPTION OF THE DRAWINGS

FIG. 5 is a sectional view of the structure of an edge of a first substrate according to the second embodiment.

FIG. 6 is a sectional view of the structure of an edge of a first substrate according to the third embodiment.

DETAILED DESCRIPTION

Figure 1:
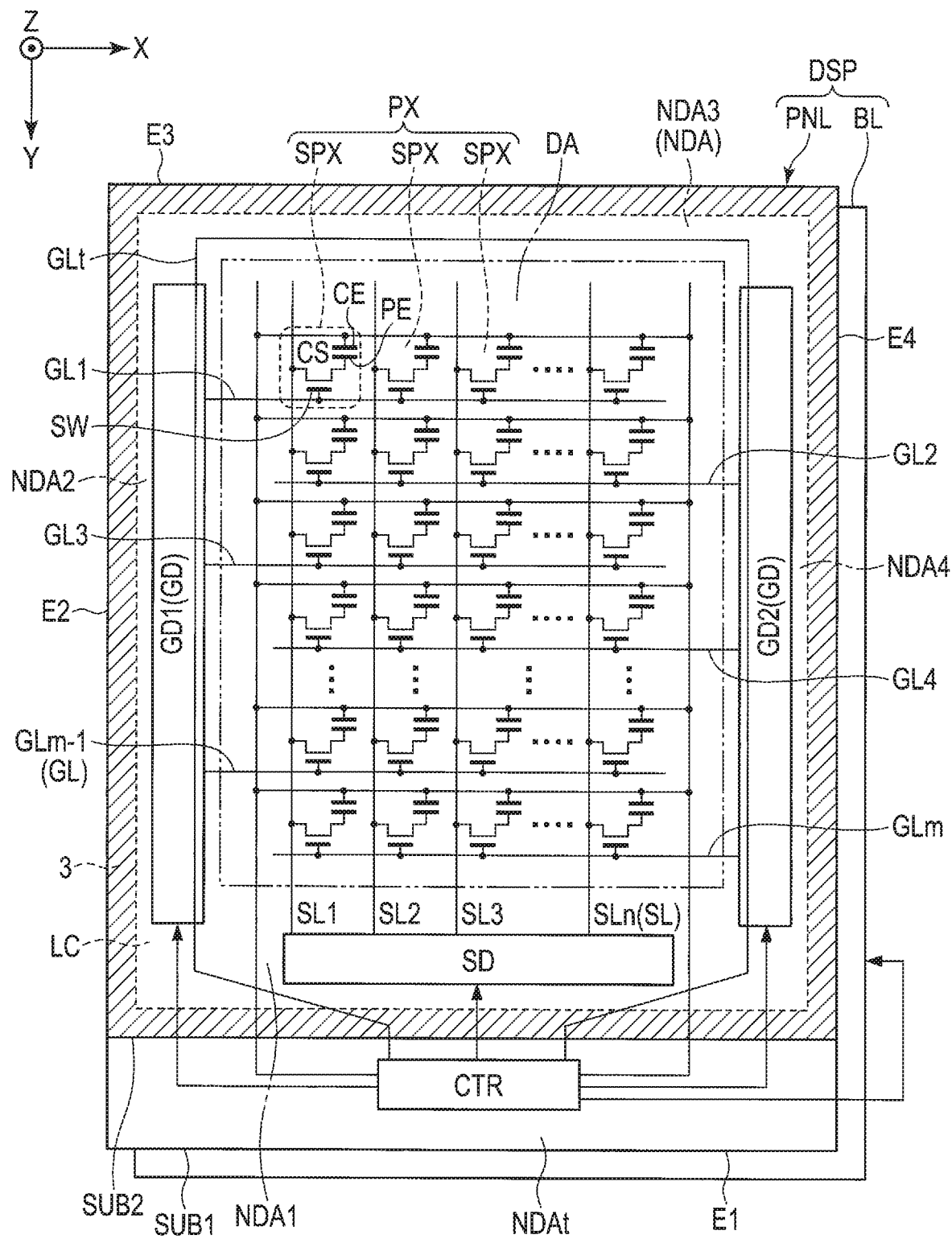
FIG. 1 is a schematic plan view of the structure of a display device common in the embodiments.

In general, according to one embodiment, a display device includes a first substrate, a second substrate, a sealant, a liquid crystal layer, an organic insulating film, an alignment film and an inorganic insulating film. The second substrate is opposed to the first substrate. The sealant attaches the first substrate and the second substrate to each other. The liquid crystal layer is arranged between the first substrate and the second substrate. The organic insulating film, the alignment film and the inorganic insulating film are provided on the first substrate. The alignment film contacts the liquid crystal layer. The inorganic insulating film is located between the alignment film and the organic insulating film. At least part of the alignment film contacts the organic insulating film.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, and the like of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

Further, in this specification, expressions such as "α includes A, B or C", "α includes any one of A, B and C" and "α is selected from a group consisting of A, B and C" do not exclude a case where a includes combinations of A, B and C unless otherwise specified. Still further, these expressions do not exclude a case where a includes other elements.

A display device DSP, which is a liquid crystal display device, will be disclosed as an example of the display device in the following description. The display device DSP can be used in various devices such as smartphones, tablet computers, mobile phones, personal computers, television receivers, in-vehicle devices, game consoles and wearable devices. The display device DSP has the function of operating in a low frequency driving mode of reducing circuit consumption power under circumstances where low power consumption is valued highly.

Firstly, the structure common in the embodiments will be described with reference to FIGS. 1 and 2. FIG. 1 is a schematic plan view of the structure of the display device DSP. The display device DSP includes a display panel (liquid crystal cell) PNL and an illumination device (backlight) BL which emits light to the display panel PNL, for example. The display panel PNL may be a reflective display panel which displays an image by selectively reflecting light entering the display surface of the display panel PNL. If the display panel PNL is a reflective display panel, the illumination device BL may be omitted.

In the following description, a view from the display surface to the back surface of the display panel PNL as shown in FIG. 1 will be defined as planar view. Further, a first direction X, a second direction Y and a third direction Z will be defined as shown in FIG. 1. The first direction X is a direction along the short sides of the display panel PNL, for example. The second direction Y is a direction along the long sides of the display panel PNL, for example. The third direction Z is the thickness direction of the display panel PNL, for example. In the example shown in FIG. 1, the first, second and third directions X, Y and Z perpendicularly cross each other. The first, second and third directions X, Y and Z may cross each other at another angle.

The display panel PNL includes a first substrate (array substrate) SUB1, a second substrate (counter-substrate) SUB2, a sealant 3 and a liquid crystal layer LC. The second substrate SUB2 is opposed to the first substrate SUB1 in the third direction Z. The first substrate SUB1 is larger than the second substrate SUB2 in the second direction Y and has a terminal area NDAt exposed from the second substrate SUB2.

Further, the first substrate SUB1 has first, second, third and fourth sides E1, E2, E3 and E4. For example, the first and third sides E1 and E3 are the short sides in the first direction X, and the second and fourth sides E2 and E4 are the long sides in the second direction Y.

The sealant 3 is formed of an organic material such as acrylic resin or epoxy resin. Further, the sealant 3 corresponds to a portion shown by rising diagonal lines shown in FIG. 1 and attaches the first substrate SUB1 and the second substrate SUB2 to each other. The liquid crystal layer LC is sealed on the inner side from the sealant 3 between the second substrate SUB2 and the first substrate SUB1.

Further, the display panel PNL has a display area DA which displays an image, and a non-display area (frame area) NDA which surrounds the display area DA. A plurality of sub-pixels SPX are arranged in an m-by-n matrix in the display area DA. For example, a pixel PX which can perform color display can be formed of the combination of three sub-pixels SPX corresponding to red (R), green (G) and blue (B). The pixel PX is not limited to this example but may include a sub-pixel SPX corresponding to another color such as white or may include sub-pixels SPX corresponding to the same color.

The non-display area NDA includes first, second, third and fourth non-display areas NDA1, NDA2, NDA3 and NDA4. The first non-display area NDA1 is located between the display area DA and the first side E1. Similarly, the second non-display area NDA2 is located between the display area DA and the second side E2. The third non-display area NDA3 is located between the display area DA and the third side E3. The fourth non-display area NDA4 is located between the display area DA and the fourth side E4. The first non-display area NDA1 includes the terminal area NDAt.

Further, the display device DSP includes a control module CTR, a scan driver GD and an image driver SD. In the example shown in FIG. 1, the display device DSP includes two scan drivers GD (GD1 and GD2). One of the two scan drivers GD1 and GD2 may be omitted.

The scan driver GD1 is formed on the first substrate SUB1 in the second non-display area NDA2. Similarly, the scan driver GD2 is formed on the first substrate SUB1 in the fourth non-display area NDA4. The scan drivers GD1 and GD2 and the image driver SD are examples of the driver circuit for image display, and can be formed together with a switching element SW of the sub-pixel SPX which will be described later in the same manufacturing process, for example.

The control module CTR is provided in the terminal area NDAt, for example. The image driver SD is formed on the inner side from the terminal area NDAt in the first non-display area NDA1, for example. The image driver SD may be formed as an IC chip on the first substrate SUB1 instead. The image driver SD may be provided in the control module CTR. The control module CTR and the image driver SD may be provided on an external circuit board connected to the display panel PNL.

Further, the display panel PNL includes a plurality of scanning signal lines GL (GL1, GL2, GL3, GL4, . . . , GLm+1) and a plurality of image signal lines SL (SL1, SL2, SL3, SL4, . . . , SLn+1) crossing the scanning signal lines GL in the display area DA. Still further, the display panel PNL includes a trap power supply line GLt in the non-display area. The trap power supply line GLt is arranged around the display area DA and is connected to the control module CTR.

The scanning lines GL extend in the first direction X and are arranged in the second direction Y. The scanning lines GL are connected to the scan drivers GD. In the example shown in FIG. 1, the odd-numbered scanning lines GL1, GL3, . . . , GLm−1 of the scanning signal lines GL are connected to the scan driver GD1, and the even-numbered scanning signal lines GL2, GL4, . . . , GLm of the scanning signal lines GL are connected to the scan driver GD2. The scan drivers GD1 and GD2 supply a scanning signal to the corresponding scanning signal lines GL.

The image signal lines SL extend in the second direction Y and are arranged in the first direction X. The image signal lines SL are connected to the image driver SD. The image driver SD supplies an image signal to the image signal lines SL.

The sub-pixels SPX are areas enclosed with the scanning signal lines GL and the imaging signal lines SL. Each of the sub-pixels SPX includes the switching element SW, a pixel electrode PE and a common electrode CE. The switching element SW is formed of a thin-film transistor (TFT), for example, and is electrically connected to the scanning signal line GL, the image signal line SL and the pixel electrode PE. The common electrode CE is formed over the sub-pixels SPX. The pixel electrode PE is connected to the switching element SW and is opposed to the common electrode CE.

When a scanning signal is supplied to the scanning signal line GL corresponding to a switching element SW, the image signal line SL and the pixel electrode PE corresponding to this switching element SW are electrically connected to each other, and an image signal of the image signal line SL is supplied to the pixel electrode PE. The pixel electrode PE forms an electric field between the pixel electrode PE and the common electrode CE and changes alignment of the liquid crystal molecules of the liquid crystal layer LC. Storage capacitance CS is formed between the common electrode CE and the pixel electrode PE, for example.

The control module CTR controls the operations of the scan drivers GD and the image driver SD. Further, the control module CTR applies a common voltage to the common electrode CE and applies a trap voltage having a potential lower or higher than the common voltage to the trap power supply line GLt. The control module CTR may be formed on an external circuit board connected to the terminal area NDAt and may control the respective members from the external circuit board.

Further, the control module CTR not only has a normal driving function but also has a low frequency driving function of reducing drive power. The low frequency driving is a driving mode of setting the frame frequency of the display device DSP to a frame frequency lower than that of a normal driving mode (for example, 60 Hz). In the low frequency driving, the frame frequency of the display device DSP is 40 Hz or less and is assumed to be 30 Hz or less or 15 Hz or less, for example. The frame frequency corresponds to the frequency of writing an image signal to the sub-pixel SPX. If the frame frequency is reduced, the frequency of writing an image signal to the sub-pixel SPX is reduced, and the power consumption of the circuits can be reduced, accordingly.

Figure 2:
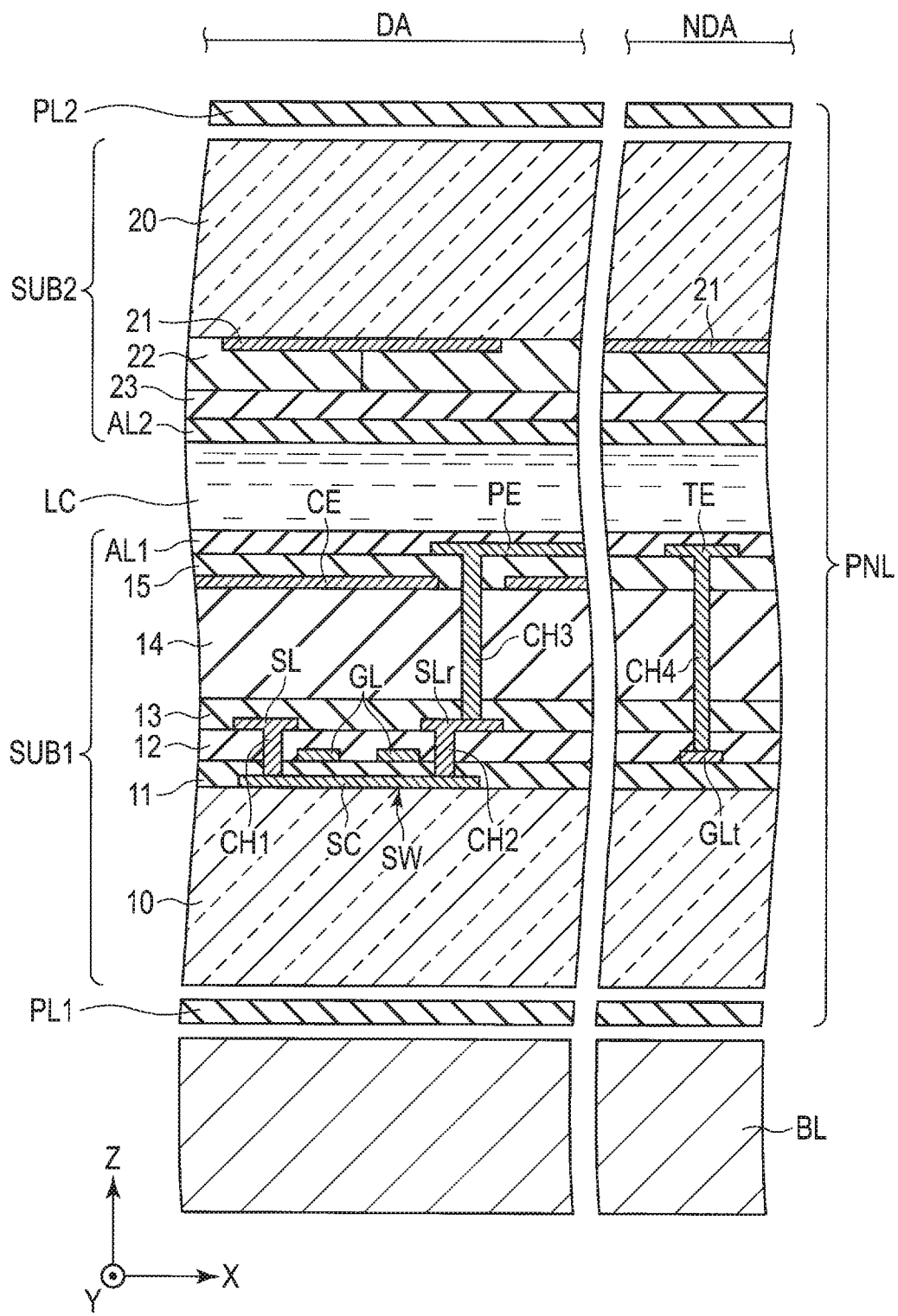
FIG. 2 is a sectional view of the structure of a display area shown in FIG. 1.

FIG. 2 is a sectional view of the display device DSP in the display area DA in the first direction X. The display panel PNL further includes a first polarizer PL1 and a second polarizer PL2. The first polarizer PL1 is arranged on the back surface side of the display panel PNL between the backlight BL and the display panel PNL. The second polarizer PL2 is arranged on the display surface side of the display panel PNL.

In the example shown in FIG. 2, the display panel PNL has a structure conforming to a display mode of mainly using a lateral electric field substantially parallel to an X-Y plane. The display panel PNL may have a structure conforming to a display mode using a longitudinal electric field perpendicular to the X-Y plane, a display mode using an oblique electric field inclined to the X-Y plane, or a display mode using a combination thereof. The display panel PNL of the display mode using the lateral electric field is suitable for the low frequency driving because the display panel PNL of the display mode using the lateral electric field is excellent in voltage holding properties as compared to that of the display mode using the longitudinal electric field.

As described above, the first substrate SUB1 includes the scanning signal line GL, the image signal line SL, and the switching element SW, the pixel electrode PE, the common electrode CE and the trap power supply line GLt. The first substrate SUB1 further includes a first insulating base 10, a first insulating film 11, a second insulating film 12, a third insulating film 13, a fourth insulating film 14, a fifth insulating film 15 and a first alignment film AL1. The switching element SW includes a semiconductor layer SC and a relay electrode SLr. The trap power supply line GLt is connected to a trap electrode TE. A voltage applied to the trap power supply line GLt is applied to the trap electrode TE.

As shown in FIG. 2, the semiconductor layer SC is formed on the first insulating base 10. Another insulating film may be interposed between the semiconductor layer SC and the first insulating base 10. The first insulating film 11 covers the semiconductor layer SC and the first insulating base 10. The scanning signal line GL and the trap power supply line GLt are formed on the first insulating film 11. The scanning signal line GL and the trap power supply line GLt can be formed in the same manufacturing process. The second insulating film 12 covers the scanning signal line GL, the trap power supply line GLt and the first insulating film 11.

The image signal line SL and the relay electrode (a source electrode or a drain electrode) SLr are formed on the second insulating film 12 and contact the semiconductor layer SC via contact holes CH1 and CH2. The image signal line SL and the relay electrode SLr can be formed in the same manufacturing process. The third insulating film 13 covers the image signal line SL, the relay electrode SLr and the second insulating film 12. The fourth insulating film 14 covers the third insulating film 13. The common electrode CE is formed on the fourth insulating film 14. The fifth insulating film 15 covers the common electrode CE and the fourth insulating film 14. The fifth insulating film 15 functions as an interlayer insulating film which insulates the pixel electrode PE and the common electrode CE from each other.

The pixel electrode PE is formed on the fifth insulating film 15 and contacts the relay electrode SLr via a contact hole CH3. The trap electrode TE is formed on the fifth insulating film 15 and contacts the trap power supply line GLt via a contact hole CH4. The pixel electrode PE and the trap electrode TE are examples of the transparent conductive film and can be formed in the same manufacturing process. The trap electrode TE is an electrode to which a voltage applied from the trap power supply line GLt (the same voltage as a gate low voltage which turns off the switching element SW, for example) is applied and which holds ions generated from the sealant 3 and the liquid crystal layer LC.

The pixel electrode PE may be formed below the fifth insulating film 15, and the common electrode CE may be formed on the fifth insulating film 15. In that case, the trap electrode TE and the common electrode CE may be formed in the same manufacturing process. The common electrode CE is another example of the transparent conductive film. The first alignment film AL1 covers the pixel electrode PE, the trap electrode TE and the fifth insulating film 15 and contacts the liquid crystal layer LC. The first alignment film AL1 aligns the liquid crystal molecules of the liquid crystal layer LC in a state where a voltage is not applied to the pixel electrode PE.

A translucent and insulating, glass base or resin base can be used as the first insulating base 10, for example. The common electrode CE, the pixel electrode PE and the trap electrode TE can be formed of a transparent conductive material such as indium tin oxide (ITO) or indium zinc oxide (IZO). The scanning signal line GL and the trap power supply line GLt, and the image signal line SL and the relay electrode SLr are metal lines having a single layer structure or a stacked layer structure, for example.

The first alignment film AL1 can be formed by applying polyimide resin, etc., by ink-jet printing, flexographic printing, etc., for example. The first alignment film AL1 may extend outside the sealant 3 (shown in FIG. 3). The first alignment film AL1 has a thickness of 100 nm, for example.

The fourth insulating film 14 is an organic insulating film formed of photosensitive resin such as acrylic resin, for example, and extends to the edges of the first substrate SUB1. The fourth insulating film 14 has the function of leveling unevenness of the switch element SW and is thicker than the first, second, third and fifth insulating films 11, 12, 13 and 15 and the first alignment film AL1. The fourth insulating film 14 may be referred to as an organic leveling film. For example, the thickness of the fourth insulating film 14 should preferably be ten or more times the thickness of the first alignment film AL1. In this way, moisture absorption properties and surface flatness which will be described later can be ensured.

The fourth insulating film 14 is formed by photolithography, for example, and the thickness is adjusted on a portion-to-portion basis by multi-tone processing such as half-tone processing (shown in FIG. 6). A portion of the fourth insulating film 14 which is not subjected to the multi-tone processing has a thickness of 3 µm, for example. A portion of the fourth insulating film 14 which is subjected to the half-tone processing has a thickness of 1.5 µm, for example.

The first, second, third and fifth insulating films 11, 12, 13 and 15 are an inorganic insulating film of silicon oxide, silicon nitride, alumina, etc. The first, second, third and fifth insulating films 11, 12, 13 and 15 are impervious to water. On the other hand, the first alignment film AL1 and the fourth insulating film 14 formed of an organic material is slightly pervious to water.

The second substrate SUB2 includes a second insulating base 20, a light-shielding layer (black matrix) 21, a color filter layer 22, an overcoat layer 23 and a second alignment film AL2. The second insulating base 20 can be formed of the same material as that of the first insulating base 10. The second alignment film AL2 can be formed of the same material as that of the first alignment film AL1.

As shown in FIG. 2, the light-shielding layer 21 is formed below the second insulating base 20. The color filter layer 22 covers the light-shielding layer 21 and the second insulating base 20. The light-shielding layer 21 is located in the non-display area NDA in planar view. Further, the light-shielding layer 21 is located directly above metal lines such as the scanning signal line GL, the image signal line SL and the relay electrode SLr, and the sub-pixels PSX are partitioned by the light-shielding layer 21 in the display area DA. The color filter layer 22 is opposed to the pixel electrode PE and partially overlaps the light-shielding layer 21.

The color filter layer 22 includes a red filter layer, a green filter layer, a blue filter layer, etc., arranged in accordance with the sub-pixels SPX. The overcoat layer 23 covers the color filter layer 22. The second alignment film AL2 covers the overcoat layer 23 and contacts the liquid crystal layer LC.

First Embodiment

Figure 3:
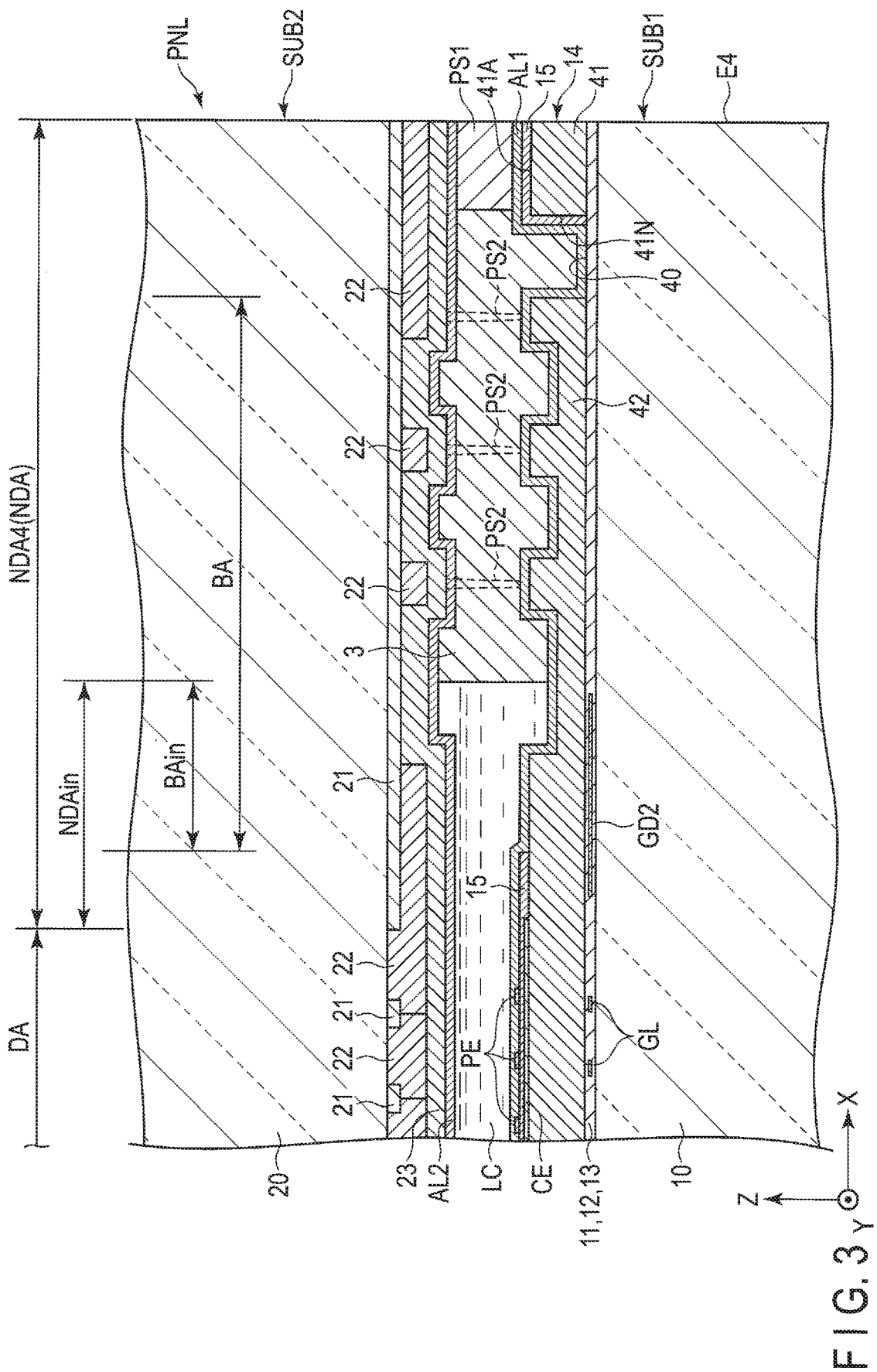
FIG. 3 is a sectional view of the structure of an edge of a first substrate according to the first embodiment.

Next, the display device DSP of the first embodiment will be described with reference to FIGS. 3 and 4. FIG. 3 is a sectional view of the structure of the display device DSP in the fourth non-display area NDA4 of the first embodiment. The cross-section structures in the first, second and third non-display areas NDA1, NDA2 and NDA3 have substantially the same shape and function as those of the cross-section structure in the fourth non-display area NDA4. Therefore, the fourth non-display area NDA4 will be described as a representative example, and redundant descriptions of the first, second and third non-display areas NDA1, NDA2 and NDA3 will be omitted.

One of the features of the display device DSP of the present embodiment is that a bypass area (contact area) BA in which the first alignment film AL1 directly contacts the fourth insulating film 14 is provided in the non-display area NDA.

As shown in FIG. 3, the fourth insulating film 14 has a groove 40 formed in such a manner as to surround the display area DA. The groove 40 can be formed by removing the fourth insulating film 14 by full-tone processing, for example. The fourth insulating film 14 is divided into a peripheral portion 41 and a central portion 42 by the groove 40. An upper surface 41A and a side surface 41N of the peripheral portion 41 are covered with the fifth insulating film 15 which is impervious to water. The fifth insulating film 15, which covers the peripheral portion 41, and the groove 40 cut out moisture entering from the peripheral portion 41 and prevent moisture from entering the central portion 42.

The display device DSP further includes a spacer PS1 and a spacer PS2 for regulating the gap between the first substrate SUB1 and the second substrate SUB2. The spacer PS1 has the shape of a frame, for example, and is arranged on the upper surface 41A of the peripheral portion 41 of the fourth insulating film 14. The spacer PS1 prevents the fluidized sealant 3 from spreading outside from the spacer PS1 when the first substrate SUB1 and the second substrate SUB2 are attached to each other by the sealant 3.

The spacer PS2 is formed in the sealant 3 on the second substrate SUB2 and projects toward the first substrate SUB1 in a column-like manner. The color filter layer 22 in the non-display area NDA overlaps the spacers PS1 and PS2 in planar view. The color filter layer 22 regulates the gap between the first substrate SUB1 and the second substrate SUB2 together with the spacer PS1 and the spacer PS2.

In the present embodiment, the fifth insulating film 15 is formed between the first alignment film AL1 and the fourth insulating film 14 in the display area DA. On the other hand, the fifth insulating film 15 is not formed between the first alignment film AL1 and the fourth insulating film 14 in the bypass area BA located in the non-display area NDA. The first alignment film AL1 and the fourth insulating film 14 directly contact each other in the bypass area BA.

In the example shown in FIG. 3, the bypass area BA is located on the inner side (on the display area DA side) from the groove 40 which cuts out moisture, and has the shape of a ring which surrounds the display area DA. The bypass area BA is not necessarily continuous but may be partially discontinuous around the display area DA. The bypass area BA should preferably include an inner bypass area BAin.

When attention is focused on the vicinity of the boundary between the liquid crystal layer LC and the sealant and if an area on the inner side from the sealant 3 and on the outer side from the display area DA is assumed to be a boundary area NDAin, the inner bypass area BAin is an area in which the boundary area NDAin and the bypass area BA overlap each other in planar view.

In the display device DSP of the present embodiment having the above-described structure, since the first alignment film AL1 contacts the fourth insulating film 14 formed of an organic insulating film, the moisture of the first alignment film AL1 can dissipate into the fourth insulating film 14.

Figure 4:
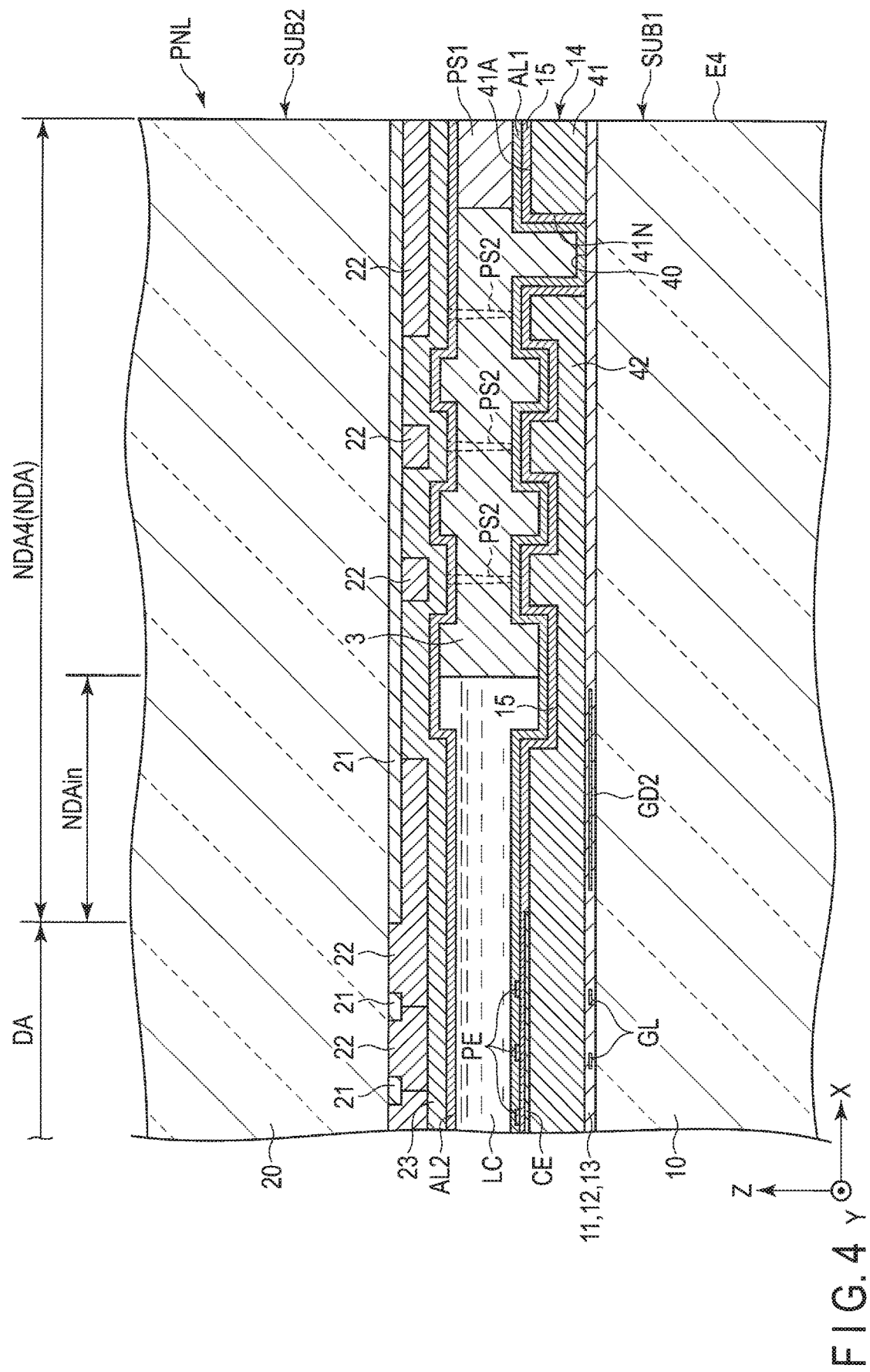
FIG. 4 is a sectional view of a comparative example of the first embodiment shown in FIG. 3.

FIG. 4 is a sectional view of a comparative example of the present embodiment. If the bypass area BA is not formed as in the comparative example shown in FIG. 4, moisture will not be distributed from the first alignment film AL1 to the fourth insulating film 14. In the comparative example shown in FIG. 4, when the display device DSP is left in hot and humid conditions for a long time, external moisture entering from the sealant 3 and the first alignment film AL1 may go beyond the groove 40 and reach the display area DA.

In the display area DA, if a reduction of volume resistivity of the liquid crystal layer LC is caused by the entering of moisture, the electric charge of the liquid crystal layer LC flows to the first alignment film AL1, and this promotes the voltage reduction of the liquid crystal layer LC. In association with this voltage reduction, the brightness of an image displayed in the display area DA decreases in cycles, that is, flicker occurs. The flicker cycle is long in the above-described low frequency driving. Further, since the rewrite cycle of the voltage of the pixel electrode PE is long, the voltage reduction of the liquid crystal layer LC becomes large. Therefore, flicker tends to be more noticeable in the low frequency driving mode as compared to the normal driving mode.

On the other hand, the display device of the present embodiment shown in FIG. 3 can distribute and dissipate the moisture entering the first alignment film AL1 into the fourth insulating film 14. Therefore, the moisture entering through the interior of the first alignment film AL1 and reaching the display area can be reduced, and flicker can be prevented, accordingly.

If the first alignment film AL1 is formed of polyimide resin and the fourth insulating film 14 is formed of acrylic resin, the first alignment film AL1 and the fourth insulating film 14 can contain about the same amount of moisture per unit volume. The fourth insulating film 14 according to the present embodiment is ten or more times thicker than the first alignment film AL1 and can sufficiently absorb the moisture of the first alignment film AL1. In the example shown in FIG. 3, the fourth insulating film 14 is 30 times thicker than the first alignment film AL1.

Meanwhile, the sealant 3 is formed of an organic material and is thus slightly pervious to water. Since the liquid crystal molecules of the liquid crystal layer LC are hardly pervious to water, the moisture entering the sealant 3 is absorbed by the first alignment film AL1. When the display device DSP does not have the inner bypass area BAin, even if all the moisture entering through the edge surface of the first alignment film AL1 from the outside dissipates into the fourth insulating film 14, the volume resistivity of the liquid crystal layer LC and the first alignment film AL1 in the display area DA may be gradually reduced by the moisture from the sealant 3.

On the other hand, in the present embodiment, the display device DSP has the inner bypass area BAin, and the first alignment film AL1 and the fourth insulating film 14 contact each other in the boundary area NDAin located on the inner side from the sealant 3 and on the outer side from the display area DA. In the present embodiment, the moisture entering the first alignment film AL1 from the sealant 3 can also dissipate into the fourth insulating film 14 in the inner bypass area BAin. Therefore, the moisture absorption of the first alignment film AL1 in the display area DA can be prevented regardless of the material of the sealant 3.

Meanwhile, the fifth insulating film 15 formed of an inorganic insulating film is inferior to the fourth insulating film 14 formed of an organic insulating film in adhesiveness with respect to the first alignment film AL1. The present embodiment can also improve the adhesive strength between the first alignment film AL1 and the fourth insulating film 14 in the vicinity of the sealant 3.

In addition, the present embodiment can provide various other advantages.

Next, display devices according to the second and third embodiments will be described. A structure having the same or a similar function as the structure described in the first embodiment will be denoted by the same reference number and will be referred to the corresponding description in the first embodiment, and detailed description thereof will be omitted. Further, structures other than those described below are the same as those of the first embodiment.

Second Embodiment

The display device DSP of the second embodiment will be described with reference FIG. 5. FIG. 5 is a sectional view of the display device DSP of the second embodiment. As shown in FIG. 5, the display device DSP of the second embodiment differs from the first embodiment in that a transparent conductive film TC is further formed in the non-display area NDA.

An example of the transparent conductive film TC formed in the non-display area NDA is the trap electrode TE. The transparent conductive film TC may serve as an electric filed shield which mitigates the impact of an electromagnetic force from the outside, etc. In the example shown in FIG. 5, the scan driver GD2 and the transparent conductive film TC partially overlap each other in planar view. The transparent conductive film TC may entirely overlap the scan driver GD2 instead. In this case, the impact of an electric field from the scan driver GD2 on the liquid crystal layer LC and the impact of an electromagnetic force from the outside on the scan driver GD2 can be prevented. Similarly, other circuits such as the scan driver GD1 and the image driver SD may partially or entirely overlap the transparent conductive film TC in planar view.

The transparent conductive film TC has the shape of a ring which surrounds the display area DA, for example. The transparent conductive film TC may not be formed in one or some of the first, second, third and fourth areas NDA1, NDA2, NDA3 and NDA4. Further, the transparent conductive film TC may be formed discontinuously in the first, second, third and fourth non-display areas NDA1, NDA2, NDA3 and NDA4.

The transparent conductive film TC can be formed together with one of the pixel electrode PE and the common electrode CE, which are transparent conductive films formed in the display area DA, in the same manufacturing process. The transparent conductive film TC is formed on the fourth insulating film 14 and is covered with the first alignment film AL1. Since the transparent conductive film TC is less pervious to water than the fourth insulating film 14, the distribution of moisture from the first alignment film AL1 to the fourth insulating film 14 is prevented in an area in which the transparent conductive film TC is formed.

The display device DSP of the second embodiment has the bypass area BA in which the fifth insulating film 15 is not formed in the non-display area NDA, similarly to the firth embodiment. The bypass area BA includes the inner bypass area BAin. In the second embodiment, the sealant 3 includes a first area 31, a second area 32, a third area 33 and a fourth area 34.

The first area 31 is located on the inner side of the sealant 3 (the display area DA side). The first alignment film AL1 contacts the transparent conductive film TC in the first area 31. The second area 32 is located on the outer side from the first area 31. The first alignment film AL1 contacts the fourth insulating film 14 in the second area 32.

The third area 33 is located on the outer side from the second area 32. In the third area 33, the first alignment film AL1 contacts the fifth insulating film 15 formed on the upper surface 41A and the side surface 41N of the peripheral portion 41 of the fourth insulating film 14. In the example shown in FIG. 5, the sealant 3 further includes the fourth area 34 between the second area 32 and the third area 33. The fourth area 34 overlaps the groove 40 formed in the fourth insulating film 14 in planar view. The first alignment film AL1 contacts the third insulating film 13 in the fourth area 34.

In the second embodiment, although the transparent conductive film TC is formed in part of the bypass area BA (for example, the first area 31 of the sealant 3), the transparent conductive film TC is not formed at least in the most part of the second area 32 and the inner bypass area BAin. That is, the first alignment film AL1 and the fourth insulating film 14 directly contact each other in the most part of the second area 32 and the inner bypass area BAin. According to the second embodiment, the reduction of electrical resistivity of the first alignment film AL1 can be prevented by dissipating moisture entering the first alignment film AL1 into the fourth insulating film 14, similarly to the first embodiment.

The fifth insulating film 15 has low adhesiveness with respect to the sealant 3 and the fourth alignment film AL1 as compared to the transparent conductive film TC. In such a structure where the transparent conductive film TC is added to the comparative example shown in FIG. 4, to improve the adhesiveness with respect to the first alignment film AL1, the transparent conductive film TC may be formed in the first, second, third and fourth areas 31, 32, 33 and 34 of the sealant 3. In such a structure, even if the fifth insulating film 15 is removed, the distribution of moisture will be prevented by the transparent conductive film TC. In view of this, not only the bypass area BA in which the fifth insulating film 15 is not formed, but also the second area 32 in which the transparent conductive film TC is not formed are provided on purpose in the second embodiment. Therefore, the adhesiveness between the first alignment film AL1 and the fourth insulating film 14 below the sealant 3 can be improved, and a moisture distribution path from the first alignment film AL1 to the fourth insulating film 14 can be secured.

Third Embodiment

The display device DSP of the third embodiment will be described with reference to FIG. 6. The third embodiment differs from the first embodiment in that the fourth insulating film 14 has a regulating portion 60 in the boundary area NDAin located on the inner side from the sealant 3 and on the outer side from the display area DA. The regulating portion 60 includes a recess 61 and a projection 62. Although three recesses 61 and two projections 62 between the adjacent recesses 61 are provided in the example shown in FIG. 6, the number of the recesses 61 and the number of the projections 62 included in the regulating portion 60 are not limited to these numbers. Further, the regulating portion 60 may only include one of the recess 61 and the projection 62.

The recess 61 extends along the sides E1, E2, E3 and E4 and is recessed from a surface 14A of the fourth insulating film 14, for example. The recess 61 can be formed by multi-tone processing such as half-tone processing, for example. A portion 14B of the fourth insulating film 14 in the thickness direction which is not removed by the multi-tone processing remains between the bottom of the recess 61 and the third insulating film 13.

The projection 62 is formed between the adjacent recesses 61, for example. In the example shown in FIG. 6, the top of the projection 62 is located at the same height as that of the surface 14A of the fourth insulating film 14, and the projection 62 is projecting when viewed from the recess 61. The top of the projection 62 may be lower than the surface 14A. Alternatively, the recess 61 may not be formed, but only the projection 62 projecting from the surface 14A of the fourth insulating film 14 may be formed. The projection 62 higher than the surface 14A of the fourth insulating film 14 can be formed together with the spacer PS1 in the same manufacturing process, for example.

In the example shown in FIG. 6, the top of the projection 62 is covered with the transparent conductive film TC such as the trap electrode TE. At the time of printing the composition of the first alignment film AL1, the composition of the first alignment film AL1 falls from the projection 62 to the recess 61. As a result, the first alignment film AL1 is divided in the regulating portion 60. The wettability of the transparent conductive film TC with respect to the composition of the first alignment film AL1 is lower than the wettability of the fourth insulating film 14 with respect to the composition of the first alignment film AL1. When the projection 62 is covered with the transparent conductive film TC, the transparent conductive film TC sheds the composition of the first alignment film AL1, and therefore the first alignment film AL1 will be more clearly divided.

According to the third embodiment, similarly to the first and second embodiments, the moisture absorption of the first alignment film AL1 can be prevented by dissipating the moisture entering from the edges of the first alignment film AL1 into the fourth insulating film 14. Further, the first alignment film AL1 is divided by the regulating portion 60 in the third embodiment. The first alignment film AL1 in the display area DA, and the edges of the first alignment film AL1 facing the outside are not continuous with each other. Therefore, the moisture from the edges can be cut out, and the moisture absorption of the first alignment film AL1 in the display area DA can be prevented.

The sealant 3 is slightly pervious to water. When the regulating portion 60 is formed in an area overlapping the sealant 3, even if moisture is cut out by the regulating portion 60, moisture may still enter from the sealant 3. In the present embodiment, the regulating portion 60 is formed in the boundary area NDAin, and therefore the regulating portion 60 can cut out moisture on the inner side from the sealant 3.

In the regulating portion 60 according to the third embodiment, the recess 61 is formed not by the full-tone processing but by the half-tone processing. Therefore, even if the regulating portion 60 is formed directly above the drive circuits (the scan drivers GD1 and GD2, etc.), the third insulating film 13 will not be exposed. Even if moisture is distributed from the first alignment film AL1 to the recess 61 of the regulating portion 60, the third insulating film 13 is covered with the portion 14B of the fourth insulating film 14 in the thickness direction, and the impact of the moisture can be reduced by the drive circuits. Since the drive circuits and the regulating portion 60 can be arranged in such a manner as to overlap each other in the narrow non-display area NDA, the design flexibility of the layout of the regulating portion 60 and the drive circuits can be increased. As a result, the frame of the display panel PNL can be narrowed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the first polarizer PL1 may be omitted by using the illumination device BL which emits polarized light. For example, the color filter layer 22 may be formed not on the second substrate SUB2 but on the first substrate SUB1.

What is claimed is:

1. A display device comprising:
   a first substrate;
   a second substrate facing the first substrate;
   a sealant which attaches the first substrate and the second substrate to each other;
   an organic insulating film provided on the first substrate;
   an organic layer provided on the first substrate, the organic insulating film being located between the first substrate and the organic layer;
   an inorganic insulating film provided on the first substrate and located between the organic layer and the organic insulating film; and
   a transparent conductive film formed on the first substrate and contacting the organic layer and the inorganic insulating film in a display area which displays an image, wherein
   the organic insulating film has an area which does not overlap with the inorganic insulating film,
   the organic layer contacts the area the organic insulating film,
   the sealant has a first area and a second area, the first area is located between the display area and the second area, and
   the organic layer contacts the transparent conductive film at a first region overlapping the first area, and contacts the organic insulating film at a second region overlapping the second area.

2. The display device of claim 1, wherein
   the organic layer does not contact the organic insulating film and contacts the inorganic insulating film in the display area.

3. The display device of claim 1, wherein
   the sealant further comprises a third area on an outer side from the second area, and
   the organic layer and the organic insulating film contact the inorganic insulating film in the third area.

4. The display device of claim 1, wherein
a voltage is applied to the transparent conductive film in the second area.
5. The display device of claim 3, wherein
a voltage is applied to the transparent conductive film in the second area.
6. The display device of claim 1, wherein
the organic insulating film has a regulating portion on an inner side from the sealant and on an outer side from the display area, and
the regulating portion includes a recess or a projection extending in a predetermined direction.
7. The display device of claim 3, wherein
the organic insulating film has a regulating portion on an inner side from the sealant and on an outer side from the display area, and
the regulating portion includes a recess or a projection extending in a predetermined direction.
8. The display device of claim 6, wherein
the first substrate includes an insulating base, and a drive circuit for displaying an image in the display area, and
the drive circuit is provided between the insulating base and the regulating portion, and overlaps the regulating portion in planar view.
9. The display device of claim 1, wherein
a frame frequency of an image displayed in a display area is 40 Hz or less.
10. The display device of claim 1, wherein,
the organic layer is an alignment film.

* * * * *